United States Patent
Swansegar et al.

[19]

[11] Patent Number: 6,155,133
[45] Date of Patent: Dec. 5, 2000

[54] ELECTRONIC TREADLE FOUR BAR ASSEMBLY

[75] Inventors: Christine G. Swansegar; Eric Tonissen, both of North Olmsted, Ohio

[73] Assignee: Honeywell Commercial Vehicle Systems Company, Elyria, Ohio

[21] Appl. No.: 09/208,092

[22] Filed: Nov. 13, 1998

[51] Int. Cl.$^7$ ........................................................ G05G 1/14

[52] U.S. Cl. .................................. 74/513; 74/512; 74/514

[58] Field of Search ........................... 74/512, 513, 514; 200/86.5

[56] References Cited

U.S. PATENT DOCUMENTS

| | | | |
|---|---|---|---|
| 4,047,145 | 9/1977 | Schwehr | 338/67 |
| 4,958,607 | 9/1990 | Lundberg | 74/513 X |
| 5,257,673 | 11/1993 | Sato et al. | 200/86.5 X |

*Primary Examiner*—Allan D. Herrmann

[57] ABSTRACT

A treadle assembly for supplying an electrical signal to an electronic controlled engine includes a treadle pivotally mounted to a treadle lever. The treadle lever is pivotally secured to a housing, and operatively connected to a drive shaft through a drive link member. The drive shaft is operatively coupled to a potentiometer to provide a proportional electrical signal dependent on the rotational position of the treadle lever.

16 Claims, 4 Drawing Sheets

ELECTRONIC TREADLE FOUR BAR ASSEMBLY

BACKGROUND OF THE INVENTION

This invention pertains to the art of electronic controlled engines and more specifically to providing an electrical input to an engine. The invention is particularly applicable to a new treadle assembly for an electronic system and will be described with reference thereto. However, it will be appreciated that the invention has broader applications and may be advantageously employed in related environments and applications.

Engine manufacturers have developed electronically controlled engines that are responsive to an electrical signal indicative of a driver's request for power. That is, the accelerator pedal or treadle assembly is located in the operator's or driver's compartment and when the treadle is depressed a suitable electronic signal is sent to an electrical control unit operatively associated with the engine. These assemblies typically include a potentiometer that generates an electronic signal corresponding to the amount of depression of the treadle. For example, systems of this type advantageously employ a rotary potentiometer mounted on the treadle so that the entire assembly can be located in the protected environment of the vehicle operator's compartment. An example of a commercially successful unit is shown and described in U.S. Pat. No. 4,528,590, the disclosure of which is commonly owned by the assignee of the present invention, and the details of which are incorporated herein by reference.

In addition to solving the problem of providing an electrical input to an electronic controlled engine, it is desirable that the arrangement also be of reduced size. The smaller sized assembly provides a wide array of options in mounting the assembly in the operator's compartment.

It is also desired to simplify the structure for maintenance and repair associated with the assembly. There is always an economic incentive to reduce the costs associated with maintenance and repair of the treadle assembly.

Many prior treadle assemblies are mounted on the floor where the components of the assembly are potentially exposed to high pressure wash, debris, mud, etc. Both the mechanical and the electrical components of the treadle assembly, such as the potentiometer, are susceptible to conditions in the vehicle operator compartment. Thus, although the vehicle operator compartment is a relatively protected mounting environment, compared to components mounted to the frame or in the engine compartment, floor mounted locations of the treadle assembly are less desirable for these additional reasons.

SUMMARY OF THE INVENTION

The present invention contemplates a new and improved treadle assembly that overcomes the above-referenced problems and others. The subject new assembly provides a simplified, economically manufactured, treadle assembly of reduced size.

According to the present invention, the treadle assembly includes a treadle or foot pedal operatively associated with a first member or treadle lever. The lever pivots about a central region in response to movement of the treadle. A second member or drive shaft lever is operatively coupled to the lever for rotation about a second axis. In addition, a potentiometer is operatively coupled to the drive shaft lever and provides a proportional electrical signal dependent on the rotational position of the drive shaft lever. A link is interposed between the treadle lever and the drive shaft lever for varying the rotational output of the drive shaft lever relative to the pivoting movement of the treadle lever.

According to another aspect of the invention, the assembly includes first and second springs that urge the assembly toward a first or default position.

According to another aspect of the invention, the assembly is suspension mounted from a generally vertical wall in the compartment so that the electronic components are located at a region less susceptible to dirt, debris, etc.

A principal advantage of the invention is the ability to provide a compact electronic treadle assembly that is sensitive to operator input.

Another advantage of the invention resides in the protection offered to the components of the assembly by means of their location.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIG. 3A is a top view corresponding to FIG. 3.

DETAILED DESCRIPTION OF THE PREFERRED EMBODIMENT

Figure 1:
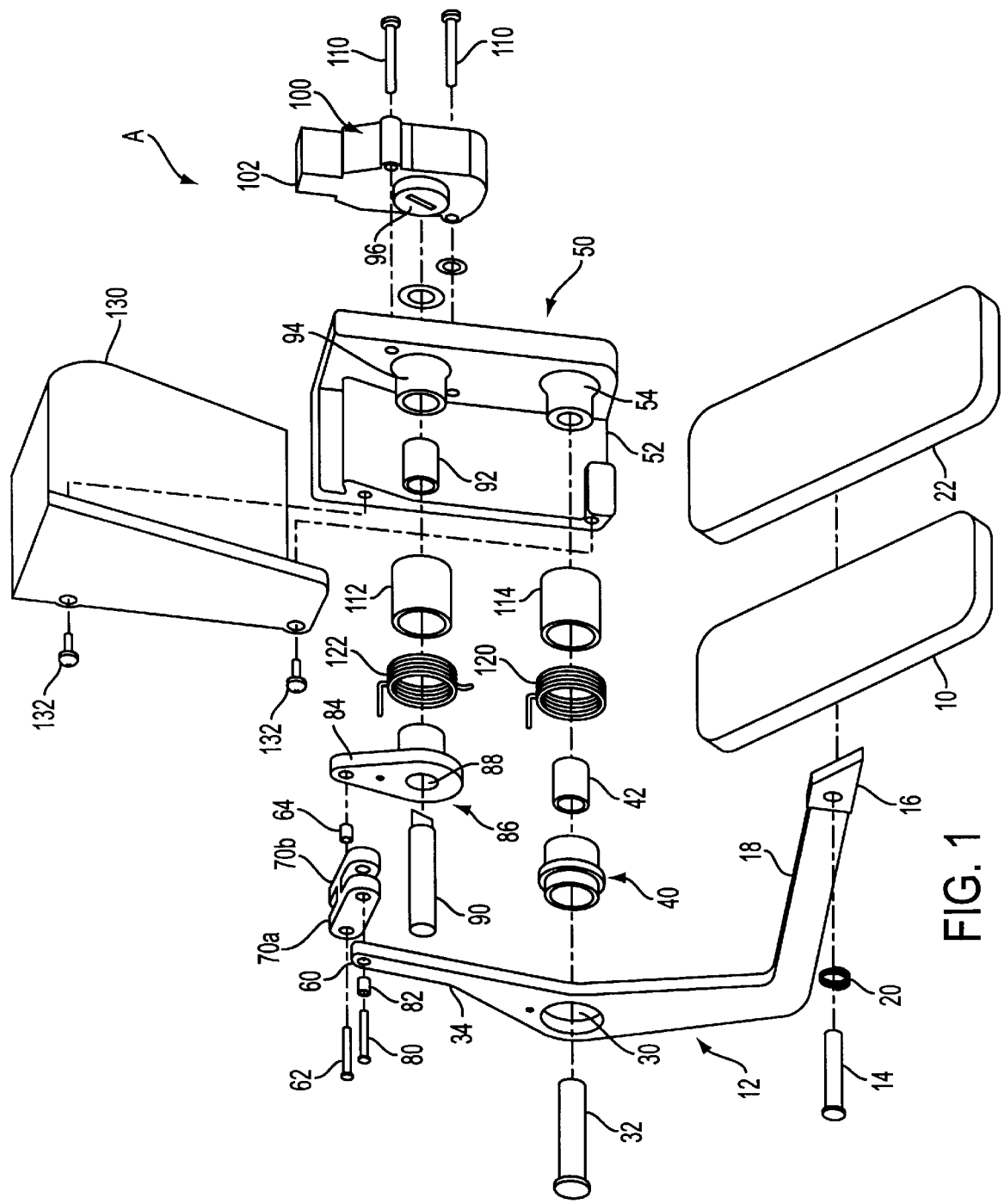
FIG. 1 is an exploded perspective view of the individual components of a preferred form of treadle assembly in accordance with the subject invention.
Figure 2:
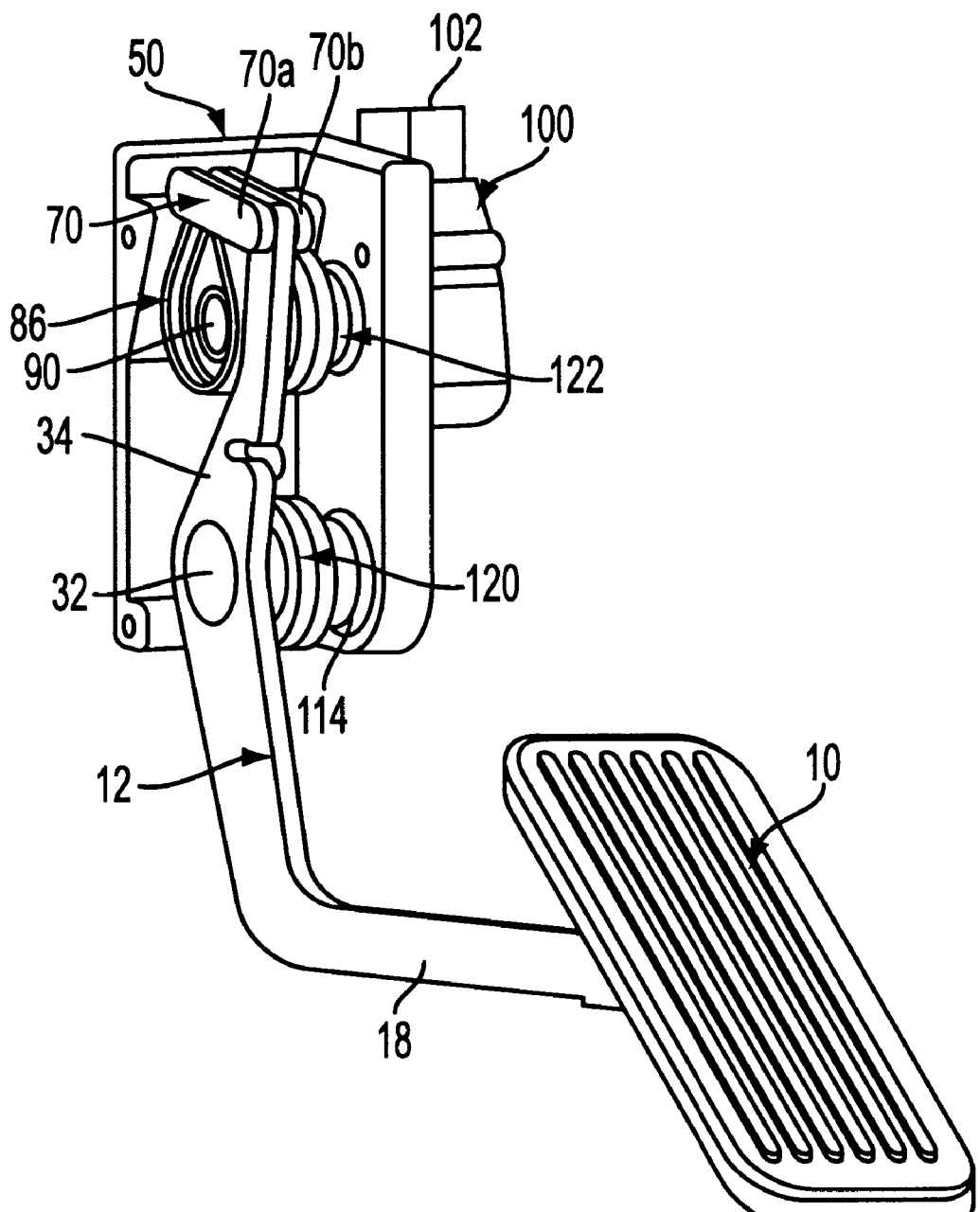
FIG. 2 is a perspective view of the assembled treadle assembly of FIG. 1 with the housing removed.
Figure 3A:
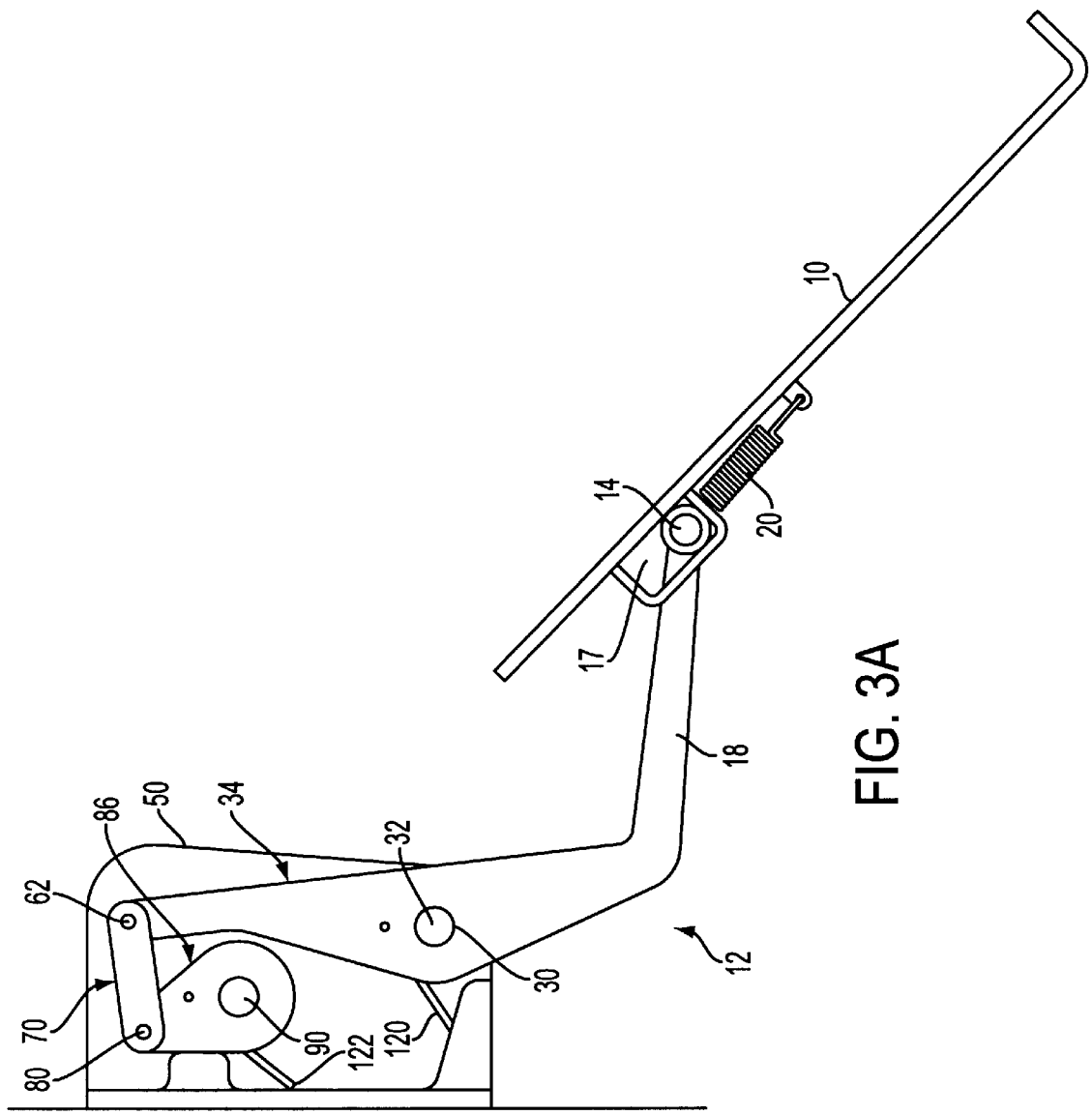
FIG. 3A is an elevational view of the assembled treadle with a portion of the housing removed therefrom and taken generally from the left-hand side of FIG. 2.
Figure 3B:
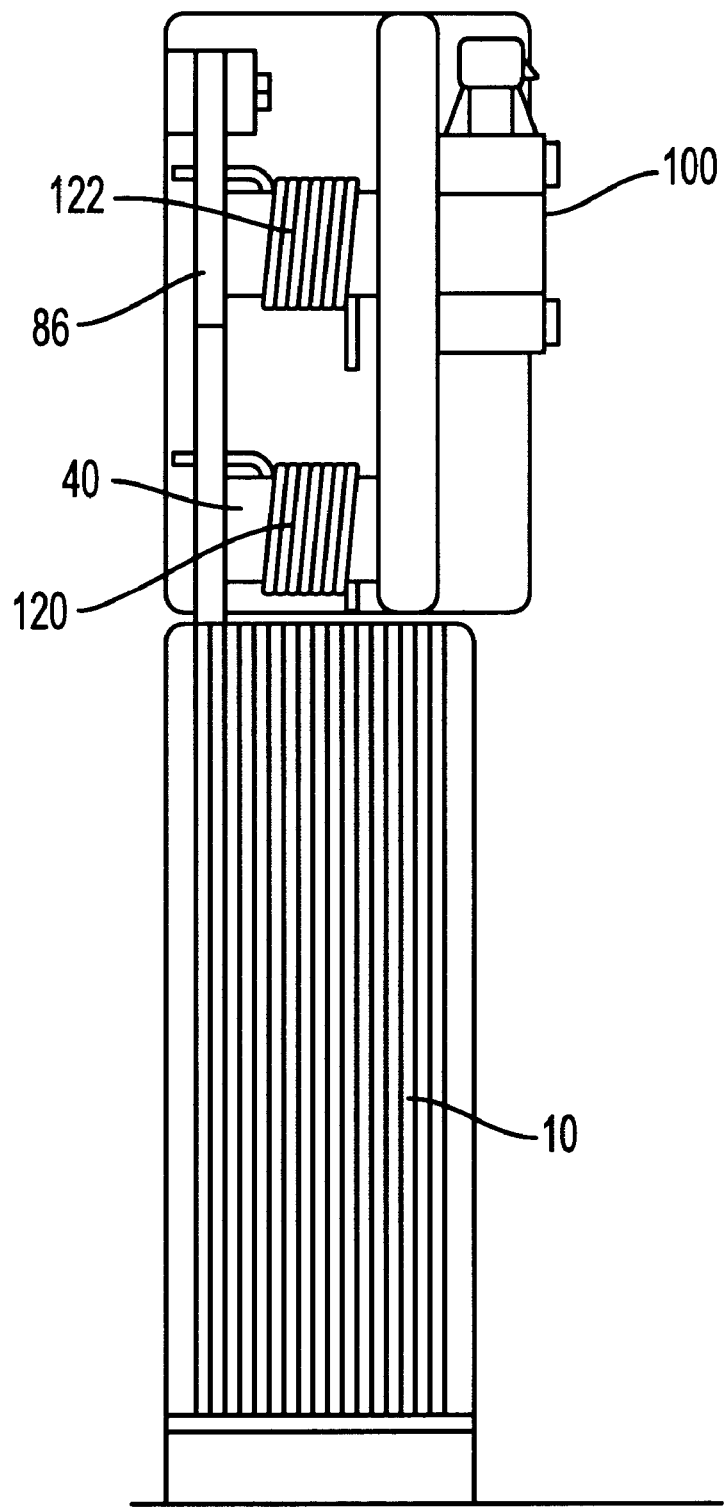
FIG. 3B is a top view of the assembled treadle.

Referring now to the drawings wherein the showings are for the purposes of illustrating the preferred embodiment of the invention and are not intended to limit the invention, the Figures show an electronic treadle assembly A. More specifically, the treadle assembly A includes a foot pedal or treadle 10 mounted to a first member or what is more commonly referred to as a treadle lever 12. In the preferred arrangement, the treadle is secured to the treadle lever via a pivot pin 14. The pivot pin passes through an opening 16 in a first or generally L-shaped input end 18 of the treadle lever and a corresponding slot 17 in a rear face of the treadle (FIG. 3A). A spring 20 is associated with the pivot pin 14, and has one end that engages the treadle lever and a second end that engages the treadle 10. The spring 20 urges the treadle to a predetermined angular position in the absence of any external force imposed on the treadle. It will be recognized that other biasing arrangements could be used without departing from the scope and intent of the subject invention. For example, a torsion spring could be received about the pin 14 with one end of the spring engaging the treadle and the other end the treadle lever. A separate cover 22 (FIG. 1), such as a rubber, plastic or other similar cover, is dimensioned for close receipt over the treadle. The cover provides a non-slip surface for engagement by the vehicle operator's foot.

The treadle lever 12 further includes an opening 30 in a central region thereof. A pivot pin 32 defines the pivoting axis of the treadle lever so that a second arm portion or output end 34 of the treadle lever rotates about the pin in response to movement of the first arm portion via the treadle. The opening 30 receives a ferrule 40 which is dimensioned for receipt in the opening and the ferrule, in turn, receives a bearing sleeve 42 that is radially interposed between the ferrule and the pivot pin 32.

An inner end of the pivot pin is received in a housing or actuator base 50. The base is part of a two part housing assembly in the preferred embodiment, although other configurations may also be used. The base is secured via fasteners (not shown) to a generally vertical wall in the vehicle operator's compartment so that the treadle assembly is suspended toward the floor. This suspension mounting arrangement reduces the problems associated with mud, water, debris, etc. that builds up on the floor of the vehicle compartment and could interfere with effective operation of the treadle assembly. A boss 52 extends into an interior cavity of the base and has a recess 54 that receives the inner end of the pivot pin 32. Thus, the treadle lever pivots relative to the base.

The second arm portion 34 of the treadle lever includes an opening 60 at one end. Just as the spacing between the opening 16 in the first arm and the opening 30 is at a predetermined dimension, so, too, is the dimension between the openings 60 and 30. Controlling the dimension assures that a predetermined output or movement of the second end of the treadle lever is attained upon a predetermined input or movement of the first end of the treadle lever. The opening 60 is dimensioned to receive a drive link pin 62. In addition, a sleeve bearing 82 concentrically receives the link pin and is disposed in and connects the second arm of the treadle lever to a drive link 70. The drive link according to the preferred embodiment is comprised of a pair of links 70*a* and 70*b* that sandwich the treadle lever therebetween. The drive link 70 has openings 72, 74 at opposite ends.

The link pin 62 allows relative rotation between the drive link 70 and the second arm 34 of the lever. Likewise, a drive link pin 80 is received through the second opening 74 of the drive link and through a sleeve bearing 82. The drive link pin 80 is, in turn, secured to an outer lobe of drive shaft lever 86 to transfer the movement of the second end of the treadle lever through the drive link to the drive shaft lever 86. This arrangement provides a compact assembly that effectively controls the output to the drive shaft lever. The drive shaft lever includes a central opening 88 that receives drive shaft 90 therethrough. The drive shaft secures the drive shaft lever to the actuator base 50, specifically through opening 92 provided in boss 94. The drive shaft is of sufficient length to extend through the opening 92, exit the base and non-rotatably engage a drive shaft recess 96 provided in potentiometer 100.

The potentiometer 100 is a conventional item. Particularly, the preferred embodiment employs a rotary potentiometer that receives a rotational input (provided by the drive shaft 90) and in response provides a suitable electrical signal at the outlet connector 102. The electrical signal is then carried via wiring (not shown) to the electronic control unit of the engine, the signal indicating the rotational position of the treadle, i.e., the amount of depression of the treadle by the operator. The potentiometer is secured via fasteners 110 to the actuator base 50.

In a preferred arrangement, nylon spacers 112, 114 are also provided for mounting the treadle lever 12 and the drive shaft lever 86 to the base. It will be appreciated, however, that in selected other arrangements, the spacers may be eliminated.

Additionally, first and second torsion springs 120, 122 are associated with the treadle assembly. The first torsion spring is preferably received about the pin 32 and ferrule 40 so that one end of the spring engages the treadle lever and the second end engages the actuator base. In the absence of any force being applied to the treadle, the first torsion spring urges the treadle to a first or idle position.

Similarly, a second torsion spring 122 is received about the hub of the drive shaft lever. A first end of the second spring engages the drive shaft lever and a second end of the torsion spring engages the actuator housing. Again, in the absence of any force applied to the treadle, the second torsion spring urges the treadle toward an idle position.

A cover member 130 is secured by fasteners 132 to the actuator base. As will be appreciated, the cover is intended to keep the cavity housing the components of the treadle assembly free from dirt and debris that may otherwise adversely impact on the operation of the linkage and treadle assembly. On the other hand, the cover is easily removed from the actuator base via the fasteners so that repair or replacement can be easily effected.

In the preferred arrangement, the suspension mounting of the housing from the vertical wall of the operator compartment locates the assembly well off the floor so that even several inches of mud, ice, water will have no impact on the operation of the treadle assembly. Since the potentiometer requires approximately fifty four degrees of input rotation, and the dimensional limitations of the vehicle compartment are limited and allow approximately eighteen degrees of treadle movement, the linkage assembly described above advantageously provides a 3:1 ratio. The linkage assembly thus provides the desired sensitivity required by the operator and yet is an effective, compact unit.

The application has been described with reference to the preferred embodiment. Obviously, modifications and alterations will occur to others upon a reading and understanding of the specification. It is intended to include all such modifications and alterations insofar as they come within the scope of the appended claims or the equivalents thereof.

Having thus described the invention, it is now claimed:

1. A treadle assembly for supplying an electrical signal to an electronic controlled engine comprising:

a treadle;

a first member operatively associated with the treadle, the first member having an axis about which the first member pivots in response to movement of the treadle;

a second member operatively coupled to the first member for rotation about a second axis in response to pivoting motion of the first member;

a potentiometer operatively coupled to the second member for providing a proportional electrical signal dependent on the rotational position of the second member; and a pair of link members interposed between and pivotally connected to the first and second members for varying the rotational output of the second member relative to the pivoting movement of the first member in a non-one-to-one ratio, wherein said first member is sandwiched between said pair of link members where the link members are pivotally connected to the first member, and said second member is sandwiched between said pair of link members where the link members are pivotally connected to the second member.

2. The invention of claim 1 further comprising a first biasing member for urging the first member toward a first position.

3. The invention of claim 2 further comprising a second biasing member for urging the second member toward a first position.

4. The invention of claim 1 further comprising a biasing member for urging the second member toward a first position.

5. The invention of claim 1 wherein the treadle is connected to the first member via a pivoting connection that transfers movement of the treadle to the first member.

6. The invention of claim 1 wherein the link member is pivotally connected to both the first member and the second member.

7. The invention of claim 1 wherein a dimension between the axis and the pivotal connection between the first member and the link members is substantially greater than a dimension between the pivotal connections of the link members.

8. The invention of claim 7 wherein the ratio of the dimensions is approximately 3:1.

9. The invention of claim 1 further comprising a biasing member for urging the treadle toward a first position.

10. A treadle assembly adapted to provide an electrical signal output for an electrically controlled engine in response to depression of a treadle comprising:

a base;

a treadle adapted to move in response to a depression force exerted by a vehicle operator;

a treadle lever connected adjacent a first end to the treadle, pivotally mounted at a central region to the base, and having a second end spaced from the central region;

a pair of drive links pivotally connected at a first pivotal connection to the treadle lever adjacent its second end such that the second end of the treadle lever is sandwiched between the pair of drive links, and having a second pivotal connection spaced therefrom;

a drive shaft lever connected to and sandwiched between the pair of drive links via its second pivotal connection; and a potentiometer operatively coupled to the drive shaft lever for providing an electrical signal in response to the rotational position of the drive shaft lever.

11. The assembly of claim 10 further comprising a first spring interposed between the base and the treadle lever for urging the lever toward a first, idle position.

12. The assembly of claim 11 wherein the first spring is a coil spring surrounding the pivotal mounting of the treadle lever to the base.

13. The assembly of claim 11 further comprising a second spring urging the drive shaft lever toward a first, idle position.

14. The assembly of claim 13 wherein the second spring is a coil spring surrounding a rotational axis of the drive shaft lever.

15. The assembly of claim 10 wherein the treadle lever has a dimension from the pivotal mounting to the first pivotal connection with the pair of drive links approximately three times the dimension between the first and second pivotal connections of the pair of drive links.

16. The assembly of claim 10 wherein the treadle includes a slot receiving a first end of the treadle lever and a spring for urging the first end of the treadle lever to one end of the slot.

* * * * *